United States Patent [19]

Jadamus et al.

[11] Patent Number: 4,690,978

[45] Date of Patent: Sep. 1, 1987

[54] THERMOPLASTIC COMPOSITIONS BASED ON POLYPHENYLENE ETHERS AND STYRENE-BUTADIENE POLYMERS PRODUCED BY EMULSION POLYMERIZATION

[75] Inventors: Hans Jadamus, Marl; Wilfried Ribbing, Dorsten; Roland Feinauer, Marl, all of Fed. Rep. of Germany

[73] Assignee: Huls Aktiengesellschaft, Marl, Fed. Rep. of Germany

[21] Appl. No.: 792,283

[22] Filed: Oct. 28, 1985

[30] Foreign Application Priority Data

Nov. 20, 1984 [DE] Fed. Rep. of Germany ....... 3442274

[51] Int. Cl.$^4$ .................. C08F 36/06; C08L 9/06; C08L 71/04
[52] U.S. Cl. .................................... 525/152; 525/68; 525/905
[58] Field of Search .................. 525/68, 132, 905, 152

[56] References Cited

FOREIGN PATENT DOCUMENTS 3424219A 1/1986 Fed. Rep. of Germany ...... 525/133

Primary Examiner—Jacob Ziegler
Attorney, Agent, or Firm—Oblon, Fisher, Spivak, McClelland & Maier

[57] ABSTRACT

The invention relates to thermoplastic compositions made up of:
A. Polyphenylene ethers, in an amount of 15-95 wt. parts;
B. Styrene resins, in an amount of 0 to 70 wt. parts;
C. E-SBR rubbers, in an amount of 3-15 wt. parts;
D. Styrene-butadiene polymers prepared by emulsion polymerization (with styrene incorporated in the copolymer in the amount of 3-15 wt. parts; and
E. Optionally, other additives.

The invention further relates to a method for preparing such thermoplastic compositions.

12 Claims, No Drawings

THERMOPLASTIC COMPOSITIONS BASED ON POLYPHENYLENE ETHERS AND STYRENE-BUTADIENE POLYMERS PRODUCED BY EMULSION POLYMERIZATION

BACKGROUND OF THE INVENTION

1. Field of the Invention

This invention relates to polyphenylene ether based thermoplastic compositions.

2. Discussion of the Background

Polyphenylene ethers ("PPEs"), also called polyphenylene oxides, are polymers with good thermal and electrical properties. In particular, poly(2,6-dimethyl-1,4-phenylene) ether has become industrially important as a component of thermoplastic molding compositions. However, there are also problems with PPEs.

For example, pure PPEs are difficult to process due to their high melt viscosity. Molded pieces produced from PPEs have high hot shape stability. but their notch sensitivity is too high for most applications.

There have been numerous attempts to improve the processibility and impact strength of PPE molded pieces (see German Pat No. 1,694,255 (corresponding to U.S. Pat. No. 3,361,851), German Pat. No. 1,694,257 (corresponding to U.S. Pat. No. 3,383,435), and German Pat. No. 1,694,290 (corresponding to U.S. Pat. No. 3,379,792)). And, it has been found that the mere addition of polyolefins, polystyrenes, and/or polyamides does not provide the optimization of the properties of PPE-containing molding compositions as would be desired.

Mixtures of PPEs with high impact polystyrenes have become quite important industrially (see German Pat. No. 2,211,005). For example, see the thermoplastic compositions disclosed in German Pat. No. 2,119,301 which are comprised of PPEs and a rubber-modified polystyrene, or PPEs and a polystyrene and a rubber, or PPEs and a rubber-modified polystyrene and a polystyrene and a rubber. Improved impact strength is claimed for compositions in which the mean particle diameter of the dispersed elastomeric phase is under a maximum of 2 micron.

Polymer mixtures based on PPEs and having specific values of impact strength and softening temperatures are of substantial significance economically. In principle, such tailored mixtures can be prepared from PPEs and high impact polystyrenes with the polystyrenes containing various amounts of rubbers. Such an approach is costly, however, because a wide variety of types of polystyrene must be kept available in order to adjust the composition to a given set of desired qualities.

It is within the realm of possibility to incorporate rubber into polystyrene following preparation of the basic polystyrene polymer, but there is the drawback that the rubber is ordinarily available only in the form of bales, and thereby difficult to handle.

This drawback can be overcome by employing a so-called "interpolymer" instead of a rubber. Thus, for example, German No. AS 22 58 896 proposes to use an interpolymer which is a graft copolymer comprised of a diene rubber in an amount of 30–70 wt. % and a vinylaromatic compound or an alkyl acrylate ester in an amount of 70–30 wt. %. If this method is employed, various properties of the thermoplastic compositions can be controlled, but only by prior tailored synthesis of a special interpolymer.

It would thus be simpler if various types of thermoplastic compositions could be prepared by simply mixing together only a few starting components.

It is known that the impact strength of thermoplastic compositions based on PPEs can be improved by adding E-SBR rubbers (see Comparison Examples C and G, in the Table infra). Thus, e.g., thermoplastic compositions based on PPEs, styrene polymers, and powdered, filler-containing rubber (see German Patent Application No. P 34 24 219.8) are known.

On the other hand, additives comprising styrene-butadiene polymers prepared by emulsion polymerization, in which the polymers have a styrene content above 80 wt. %, have virtually no effect on the impact strength of PPE-containing thermoplastic compositions (see Comparison Examples A, B, and F, infra).

Hence there remains a strongly felt need for a thermoplastic composition which can be prepared simply and which is imbued with high dimensional stability under heat and high impact strength.

SUMMARY OF THE INVENTION

Accordingly, one object of this invention is to provide a novel thermoplastic composition which can be prepared simply.

It is another object of this invention to provide a novel thermoplastic composition which has a high impact strength.

It is another object of this invention to provide a novel thermoplastic composition which has a high softening temperature.

It is another object of this invention to provide a novel thermoplastic composition which can be prepared easily, has a high impact strength and a high softening temperature.

It is another object of this invention to provide a novel thermoplastic composition based on PPEs and E-SBR rubber, and which can be prepared simply.

It is another object of this invention to provide a novel thermoplastic composition based on PPEs and E-SBR rubber, and which has a high impact strength.

It is another object of this invention to provide a thermoplastic compositioned based on PPEs and E-SBR rubber, and which has a high softening temperature.

It is another object of this invention to provide a novel thermoplastic composition based on PPEs and E-SBR rubber, and which can be prepared easily, has a high impact strength and a high softening temperature.

The above objects of this invention have been made possible by the surprising discovery that the impact strength of thermoplastic compositions based on PPEs and E-SBR rubbers is improved by the addition of styrene-butadiene polymers prepared by emulsion polymerization and having a styrene content of 80–95 wt. % (see Examples 11–17, infra). The present invention is particularly surprising in view of the fact that styrene-butadiene polymers prepared by emulsion polymerization are ineffective when used alone, i.e., in the absence of E-SBR rubbers.

Accordingly, the present invention relates to thermoplastic compositions based on polyphenylene ethers (PPEs), E-SBR rubbers, and styrene resins. The polyphenylene ethers may be used in an amount of 15 to 95 parts by weight; the styrene resins in an amount of from 0 to 70 parts by weight; the E-SBR rubbers in an amount of 3 to 15 parts by weight; and the styrene-butadiene polymers which are prepared by emulsion polymerization and in which styrene is incorporated in greater than 80 wt. %, may be used in an amount of from 3 to 15 parts by weight. This thermoplastic composition may also optionally contain other additives.

The present invention also relates to a method for preparing these thermoplastic compositions in which the various components making up the composition are first melted and then mixed together.

DESCRIPTION OF THE PREFERRED EMBODIMENTS

The present thermoplastic compositions are based on polyphenylene ethers (PPEs), E-SBR rubbers, and styrene resins. They are characterized in that they comprise the following components:

(A) PPEs in an amount of from 15 to 95 parts by weight;

(B) Styrene resins in an amount of from 0 to 70 parts by weight;

(C) E-SBR rubbers in an amount of from 3 to 15 parts by weight;

(D) Styrene-butadiene polymers in an amount of from 3 to 15 parts by weight where the polymers are prepared by emulsion polymerization in which the styrene is incorporated in the copolymer in an amount of >80 wt. %; and, (E) Optionally, other additives (vide infra).

In a preferred embodiment, the present thermoplastic compositions may be characterized in that component (A) is a 2,6-dimethylphenol based polymer.

In another preferred embodiment, the present thermoplastic compositions may be characterized in that the polymer (A) has a viscosity value of 40–65 ml/g (according to DIN 53 728).

In another preferred embodiment, the present thermoplastic compositions may be characterized in that component (B) is a styrene polymer rendered impact resistant by the addition of poly(cis-butadiene).

In another preferred embodiment, the present thermoplastic compositions may be characterized in that component (C) is a powdered, filler-containing rubber.

In another preferred embodiment, the present thermoplastic compositions may be characterized in that instead of components (C) and (D), a mixture of polymers comprising an E-SBR rubber and an E-SB copolymer is used.

In another preferred embodiment, the present thermoplastic compositions may be characterized in that component (D) comprises styrene monomer units in an amount of from 82 to 90 wt. %.

In another preferred embodiment, the present thermoplastic compositions may be characterized in that they comprise the following components:

a. Component (A) in an amount of 25 to 90 parts by weight;
b. Component (B) in an amount of 0 to 70 parts by weight;
c. Component (C) in an amount of 6 to 12 parts by weight; and
d. Component (D) in an amount of 6 to 12 parts by weight.

The present invention also provides a method for preparing these thermoplastic compositions. In this method components (A), (B), (C), (D), and possibly the additives (E), are melted and mixed together.

In the context of the present invention, the term "thermoplastic compositions" should be understood to mean unformed mixtures which can be processed by thermoplastic fabrication to produce molded pieces or semi-finished products. The thermoplastic compositions may be in the form of, e.g., granulate.

The chief candidates for the polyphenylene ethers (A) are based on 2,6-dimethylphenol polyethers, where the ether oxygen of one monomer unit is bound to the benzene nucleus of the neighboring unit. In this way, at least 50 units should be linked together.

Other basic candidates are other o,o'-dialkylphenols, preferably with alkyl groups each having at most 6 carbon atoms, and provided that no such alkyl group has a tertiary carbon atom in the alpha-position. Suitable phenols include o-alkylphenols provided that the alkyl group has a tertiary carbon atom in the alpha-position and at most 6 carbon atoms. Futher, any of the indicated monomeric phenols may have a methyl group substituent in the 3-position, and also possibly in the 5-position. Obviously, mixtures of the monomeric phenols may be used as well.

The PPEs may be prepared from the phenols in the presence of, e.g., complex-forming agents, such as copper bromide and morpholine (see German Nos. OSs 32 24 692 and 32 24 691—U.S. Pat. Nos. 4,429,106 and 4,440,923 respectively). The viscosity values (J-values) determined according to DIN 53 728 in chloroform at 25° C. are in the range 35–80 ml/g. The preferred polymer is a polymer of 2,6-dimethylphenol, namely poly(2,6-dimethyl-1,4-phenylene) ether, with a viscosity value of from 40 to 65 ml/g.

The PPEs are ordinarily employed in the form of powder or granulate.

As the styrene polymer, component (B), styrene homopolymers and/or high impact styrene polymers are employed.

The styrene homopolymers are prepared in known fashion, from styrene, by radical polymerization either in suspension or in bulk.

Their molecular weight should be between 150,000 and 300,000 (see "Kunststoff-Handbuch, Band V, Polystyrol" ("Plastics Handbook, Vol. V, Polystyrene"), pub. Carl Hanser Verlag, Munich, 1969; and "Ullmanns Encyklopedie der technischen Chemie", 4th Ed., Vol. 19, pub. Verlag Chemie, Weinheim, FRG, 1980).

The high impact styrene polymers are prepared in known fashion, whereby solutions of poly(cis-butadiene) in styrene are polymerized either in a solvent or aqueous dispersion or in bulk.

In the so-called "mixed process", the solution of rubber in styrene is pre-polymerized neat, and is then further polymerized to the desired end point in an aqueous dispersion (see, e.g., U.S. Pat. Nos. 2,694,692 and 2,862,906).

The particle size of the soft phase is adjusted in the pre-polymerization stage prior to the so-called phase inversion by a technique which is per se known. The synthesis of the high impact styrene polymers may also be carried out in the presence of known chain-length regulators and/or radical initiators. Process details such as the relation between the stirring speed and the size and distribution of the rubber particles in the resulting high impact polymer are known to one skilled in the art (see, e.g., Freeguard, 1974, *Brit. Polym. J.*, 6:203–228).

The diameter of the particles in the elastomeric gel phase is ordinarily below 10 micron, preferably below 3.5 micron. The volumetric mean equivalent diameter is in the range of 1 to 5 micron. In this mean-diameter determination, particles with diameters <0.5 micron or >10 micron are disregarded.

The volumetric mean particle size is determined by determining (from measurements) and averaging the diameters of equivalent circles (i.e., the "equivalent diameters") of the particles, from thin layer electron micrographs.

Using a distribution plot of the volumes (third power of equivalent diameter) of the particles, the volumetric mean is calculated. At least 2000 particles are used for the determination.

The E-SBR rubber (component (C)) comprises styrene in an amount of 15-40 wt. % and butadiene in an amount of 85-60 wt. %. The Mooney viscosity ML(1+4)100° C. is between 30 and 130 (see Mooney, 1957, *Rubber Chem. Techn.*, 30:460). The rubber is synthesized by emulsion polymerization.

Within the scope of the invention, preferably either polymer mixtures of components (C) and (D) (for (D), see infra) or a powdered, filler-containing rubber are employed. The latter rubber is as a rule pourable (e.g., as small solid particles) even after storage. The volumetric mean diameter of the particles should be below 1 mm. but the particles should not be so small that substantial dust is evolved when they are mixed with other materials.

Component (C) is a rubber based on styrene and butadiene, which is synthesized by emulsion polymerization. It is designated an "E-SBR" for short. It contains 15-40 wt. % styrene and 85-60 wt. % butadiene.

The amount of powdered, filler-containing rubber in the thermoplastic compositions is between 0.5 and 50 wt. %, preferably 10-25 wt. %. There are a number of different methods of preparing powdered, filler-containing rubbers. A number of the known processes are so lengthy and complex, however, that they have not acquired any appreciable industrial and/or practical acceptance. Recently, the process described in German No. OS 28 22 148 (U.S. Pat. No. 4,250,082) has been employed industrially. This process is distinguished in that the rubber component is mixed in dissolved form with an aqueous suspension of filler, which suspension is further comprised of a water-soluble aluminum salt and water glass. It is crucial that the aqueous filler dispersion have pH 3.0-3.7, and that when this dispersion is mixed with the rubber component one adds mineral acid in an amount such that this pH range is maintained in the resulting mixture.

Candidates for fillers for the filler-containing rubber include silicates, but preferably the filler is carbon black. For further details, reference is made to German No. OS 28 22 148 (U.S. Pat. No. 4,250,082). The filler content of the powdered, filler-containing SBR rubber employed is between 10 and 80 wt. %, preferably 30-60 wt. %.

The preferred powdered, filler-containing rubbers in the context of the invention are those prepared according to the method of German No. OS 28 22 148 (U.S. Pat. No. 4,250,082), which is hereby incorporated by reference.

The E-SB styrene-butadiene copolymer (component (D)) comprises styrene in an amount of 80-95 wt. % and butadiene in the amount of 5-20 wt. %. Its molecular weight is between 100,000 and 250,000. This product too is manufactured by emulsion polymerization.

Component (E) which may be optionally added to the inventive thermoplastic compositions may comprise a flame retardant and/or other additives such as pigments, oligomers, antistatic agents, stabilizers, agents which promote processibility, and reinforcing and filling materials, all of which are all well known in this art. The reinforcing and filling materials may be present in an amount of up to 50 wt. %, the flame retardant up to 15 wt. %, and the sum of all other additives up to 5 wt. % (with the wt. % figures being based on the entire weight of the molding composition).

Particularly suitable flame retardants are aromatic phosphorus compounds, such as triphenylphosphine oxide and triphenyl phosphate. Also alternatively, a customary halogen-containing flame retardant may be used. Candidates among such flame retardants include halogen-containing organic compounds such as are described, e.g., in the monograph of H. Vogel, "Flammenfestmachen von Kunststoff" ("Fireproofing of plastics"), pub. Huethig-Verlag, 1966, pp. 94-102. Halogenated polymers, e.g. halogenated PPEs (see German No. OS 33 34 068—U.S. patent application Ser. No. 652,539, filed Sept. 20, 1984) or brominated oligoor polystyrenes, may also be used. The halogen-containing compounds should be comprised of halogen in the amount of >30 wt. %.

In the case of use of a halogenated flame retardant, it is recommended that a synergist be used as well. Suitable synergists are compounds of antimony, boron, or zinc. In general these are employed in amounts of 0.5 to 10 wt. % based on the weight of the thermoplastic compositions.

Suitable reinforcing materials are, in particular, glass fibers or carbon fibers. A suitable filling material is titanium dioxide.

Suitable stabilizers include organic phosphates, e.g. didecyl phenyl phosphite or trilauryl phosphite; sterically hindered phenols; or derivatives of tetramethylpiperidine, of benzophenone, or of triazole.

Suitable agents which promote processibility include waxes, e.g. oxidized hydrocarbons and alkali or alkaline earth salts of these.

Preferably, the inventive molding compositions are prepared by mixing the components in the molten state. At least one component is melted, and the other components are mixed into the resulting melt. Another possible procedure is to melt all the components together at the same time, and to mix them.

Preferably melting temperatures of 250°-350° C. are employed for the melting process, particularly 250°-300° C.; with residence times at these temperatures being preferably 0.3 to 10 min, particularly 0.5-3 min.

Suitable equipment for the melting and mixing is ordinary equipment for handling highly viscous melts, either batch-type or continuous-type equipment. Particularly suitable are double-screw kneader-mixers and co-kneaders.

However, it is also possible to prepare the inventive molding compositions by other means than compounding; e.g., by precipitation from a mixed solution of the components. A suitable common solvent is, e.g., toluene; and a suitable precipitating agent is, e.g., methanol. The polymer mixture may alternatively be recovered by evaporating the solvent, e.g. according to German Patent Application No. P 33 37 629.8. (see U.S. patent application Ser. No. 657,247, filed Mar. 10, 1984).

The molding compositions may be processed by techniques customarily used for thermoplastics, e.g. injection molding or extrusion, to produce molded or formed pieces. General examples of possible industrial applications are tube, plate, housings, and other industrial products for the automotive, electrical, and precision manufacturing sectors.

Other features of the invention will become apparent in the course of the following description of exemplary embodiments which are given for purposes of illustration of the invention and are not intended to be limiting thereof.

ORIGIN AND PREPARATION OF THE COMPONENTS

1. Polyphenylene ether:

The PPE is obtained by oxidative coupling of 2,6-dimethylphenol, interrupting the reaction at the desired J-value, and then carrying out reaction-extraction according to Nos. German OSs 33 13 864 and 33 32 377 (U.S. patent applications Ser. No. 582,711, filed Feb. 23, 1984 and No. 632,125, filed July 18, 1984, respectively).

For example, the reaction-extraction process described in U.S. patent application Ser. No. 632,125 may be carried out as follows. The polycondensation catalyzed by copper-amine complex is interrupted (e.g. by the addition of $CO_2$ and $H_2O$). The interrupted reaction mixture is then treated with water or steam at a temperature of from 60° to 150° C.

1.1 PPE (i.e., pure PPE used (cf. 1.2)): A PPE with J-value 55 ml/g (determined in chloroform according to DIN 53 728) was prepared according to the general Preparation method. The solvent was removed by evaporation, and the melt was extruded in a degassing extruder, followed by granulation. 1.2. 55:45 Blend of PPE and HIPS (high impact polystyrene): A PPE with J-value 50 ml/g (determined in chloroform according to DIN 53 728) was prepared by oxidative coupling of 2,6-dimethylphenol. The reaction was interrupted, followed by reaction-extraction according to German Nos. OSs 33 13 864 and 33 32 377. A mixture of this PPE and a rubber-modified polystyrene (HIPS—see 2.1) in a ratio of 55:45 by weight was prepared according to German patent application No. 33 37 629.8 (U.S. patent application Ser. No. 657,247, filed Mar. 10, 1984).

2. Styrene polymer (see also 1.2, supra):

2.1. HIPS: For the high impact styrene polymer, Vestyron ® 616 of the firm Huels AG, of D-4370 Marl 1, FRG, was used. The characterizing parameters of this product may be found in the brochure "Plastics of Huels: Vestyron ®" (in German), Edition of September, 1983.

3. E-SBR rubber:

3.1. 7:10 Mixture of carbon black and E-SBR: A powdered E-SBR rubber (based on styrene in the amount of 23.5 wt. % and butadiene in the amount of 76.5 wt. %), comprising in addition carbon black in an amount of 41 wt. % of the total, was prepared according to German No. OS 28 22 148 (U.S. Pat. No 4,250,082).

3.2. 60:40 Mixture of E-SB and E-SBR: A polymer mixture was employed which comprised 60 parts by weight of a styrene-butadiene copolymer (said copolymer containing 85 wt. % styrene and 15 wt. % butadiene) and 40 parts by weight of an E-SBR rubber (with styrene:butadiene ratio in said rubber being 23.5: 76.5 by weight). Both components were prepared by known methods of radical emulsion polymerization.

4. Styrene-butadiene polymers prepared by emulsion polymerization (see also 3.2, supra):

4.1. E-SB: A styrene-butadiene polymer prepared by emulsion polymerization, from 85 wt. parts styrene and 15 wt. parts butadiene, was used.

5. Additives:

5.1. Didecyl phenyl phosphite.

5.2. Octadecyl 3-(3,5-t-butyl-4-hydroxyphenyl)-propanoate.

5.3. Wax: An oxidized polyethylene wax with a molecular weight of about 1,500. Such a product may be prepared in known fashion by oxidation of polyethylene. It is commercially available under the trade name Vestowax ® AO 1539, from Huels AG, of D-4370 Marl 1, FRG.

PREPARATION AND TESTING OF THE POLYMER MIXTURES

The impact resistant polymer mixtures were prepared using a "ZSK 30" double-screw kneader-mixer supplied by the firm Werner and Pflederer, which kneader-mixer had conveying, kneading, and degassing zones.

The components were mixed mechanically and were melted together in the ZSK 30. A uniform cylinder temperature of 230° C. and a screw rpm of 250 were used. The strings of melt which were produced were granulated by customary techniques. The granulate was dried at 110° C. to a moisture content of less than 0.05 wt. %.

The granulate was molded into standard small bars on an injection molding machine at a cylinder temperature of 240°–260° C. and a mold temperature of 90° C., for use in determining the impact strength according to DIN 53 453.

The Vicat softening temperature was determined according to DIN 53 460, using 4 mm thick pressed plates which were produced at 250° C.

| | Formulation[1] | | | | | Composition in terms of polymer (wt. %) | | | | | Properties | | |
|---|---|---|---|---|---|---|---|---|---|---|---|---|---|
| | | PPE:HIPS Blend 55.45 | | | E-SB: E-SBR 60:40 | Carbon Black: E-SBR 7:10 | | | | | | Impact Strength DIN 53 453 ($kJ/m^2$) | Vicat softening temperature DIN 53 460 (°C.) | |
| Ex. No. | PPE | | HIPS | E-SB | | | PPE | HIPS | E-SB | E-SBR | Carbon Black | | A | B |
| A | 0 | 62 | 38 | 0 | 0 | 0 | 33.9 | 65.9 | 0 | 0 | 0 | 9.7 | 128 | 120 |
| B | 0 | 62 | 23 | 15 | 0 | 0 | 33.9 | 50.9 | 15 | 0 | 0 | 9.9 | 126 | 114 |
| C | 0 | 62 | 33 | 0 | 0 | 8.5 | 33.9 | 60.9 | 0 | 5 | 3.5 | 11.9 | 130 | 121 |
| 11 | 0 | 62 | 25.5 | 7.5 | 0 | 8.5 | 33.9 | 53.4 | 7.5 | 5 | 3.5 | 13.2 | 128 | 118 |
| 12 | 0 | 62 | 29.25 | 0 | 6.25 | 4.25 | 33.9 | 57.15 | 3.75 | 5 | 1.75 | 13.6 | 131 | 124 |
| 13 | 0 | 62 | 25.5 | 0 | 12.5 | 0 | 33.9 | 53.4 | 7.5 | 5 | 0 | 13.9 | 128 | 117 |
| D | 0 | 62 | 28 | 0 | 0 | 17 | 33.9 | 55.9 | 0 | 10 | 7 | 12.5 | 131 | 121 |
| 14 | 0 | 62 | 13 | 15 | 0 | 17 | 33.9 | 40.9 | 15 | 10 | 7 | 16.0 | 129 | 116 |
| 15 | 0 | 62 | 20.5 | 0 | 12.5 | 8.5 | 33.9 | 48.4 | 7.5 | 10 | 3.5 | 16.3 | 129 | 116 |
| 16 | 0 | 62 | 13 | 0 | 25 | 0 | 33.9 | 40.9 | 15 | 10 | 0 | 18.1 | 127 | 115 |
| E | 100 | 0 | 0 | 0 | 0 | 0 | 100 | 0 | 0 | 0 | 0 | 7 | 205 | 195 |
| F | 100 | 0 | 0 | 20 | 0 | 0 | 83.3 | 0 | 16.7 | 0 | 0 | 6 | 165 | 158 |

-continued

| | Formulation[1] | | | | | | Composition in terms of polymer (wt. %) | | | | | Properties | | |
|---|---|---|---|---|---|---|---|---|---|---|---|---|---|---|
| | | PPE:HIPS Blend | | | E-SB: E-SBR | Carbon Black: E-SBR | | | | | | Impact Strength DIN 53 453 | Vicat softening temperature DIN 53 460 (°C.) | |
| Ex. No. | PPE | 55.45 | HIPS | E-SB | 60:40 | 7:10 | PPE | HIPS | E-SB | E-SBR | Carbon Black | (kJ/m$^2$) | A | B |
| G | 100 | 0 | 0 | 0 | 0 | 20 | 89.5 | 0 | 0 | 10.5 | 7.3 | 10 | 206 | 195 |
| 17 | 100 | 0 | 0 | 0 | 20 | 0 | 83.3 | 0 | 10.0 | 6.7 | 0 | 16 | 187 | 165 |

[1]All mixtures contained, in addition to 100 parts by weight of the sum of PPE and HIPS, 0.5 parts by weight of component "5.1", 0.5 parts by weight of component "5.2", and 1.5 parts by weight of component "5.3".

1. All mixtures contained, in addition to 100 parts by weight of the sum of PPE and HIPS, 0.5 parts by weight of component "5.1", 0.5 parts by weight of component "5.2", and 1.5 parts by weight of component "5.3".

Obviously, numerous modifications and variations of the present invention are possible in light of the above teachings. It is therefore to be understood that within the scope of the appended claims, the invention may be practiced otherwise than as specifically described herein.

What is claim as new and desired to be secured by Letters Patent of the United States is:

1. A thermoplastic composition, comprising:
   (A) a polyphenylene ether in an amount of from 15 to 95 parts by weight;
   (C) a styrene butadiene rubber, obtained by emulsion polymerization, in an amount of from 3 to 15 parts by weight; and
   (D) a styrene-butadiene copolymer prepared by emulsion polymerization, wherein the said styrene is incorporated in the copolymer in an amount of >80 wt. %, the said styrene-butadiene copolymer being present in an amount of from 3 to 15 parts by weight.
2. The thermoplastic composition of claim 1, wherein component (A) is a 2,6-dimethylphenol-based polymer.
3. The thermoplastic composition of claim 1, wherein component (A) is a o,o'-dialkylphenol-based polymer, wherein the said alkyl groups are each $C_1$ to $C_6$ alkyls.
4. The thermoplastic composition of claim 1, wherein polymer (A) has a viscosity value of 40 to 65 ml/g (according to DIN 53728).
5. The thermoplastic composition of claim 1, wherein component (C) is a powdered, filler-containing styrene butadiene rubber obtained by emulsion polymerization.
6. The thermoplastic composition of claim 1, wherein component (D) comprises styrene monomer units in an amount of from 82 to 90 wt. %.
7. The theromoplastic composition of claim 1, comprising at least one member selected from the group consisting of flame retardants, pigments, oligomers, antistatic agents, stabilizers, processibility promoters, reinforcing materials, and filling materials.
8. A method for preparing the thermoplastic composition of claim 1, which comprises melting and then mixing together components (A), (C) and (D).
9. The method of claim 8, wherein a temperature of from 250° to 350° C. is used for the melting process.
10. The method of claim 9, wherein a residence time of from 0.3 to 10 minutes is used.
11. The method of claim 8, wherein the said method is run continuously or in a batch-wise manner.
12. The method of claim 8, wherein a double-screw kneader-mixer or a co-kneader is used.

* * * * *